(12) United States Patent
Rai

(10) Patent No.: US 6,593,769 B1
(45) Date of Patent: Jul. 15, 2003

(54) DIFFERENTIAL, REDUCED SWING BUFFER DESIGN

(75) Inventor: Hariom Rai, Bangalore (IN)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/650,437

(22) Filed: Aug. 29, 2000

(51) Int. Cl.⁷ ............................................... H03K 17/16
(52) U.S. Cl. ............................ 326/30; 326/32; 326/86
(58) Field of Search .......................... 326/30–34, 86, 326/83

(56) References Cited

U.S. PATENT DOCUMENTS

| 5,525,919 | A | * | 6/1996 | Phelan | 327/52 |
|---|---|---|---|---|---|
| 5,717,345 | A | * | 2/1998 | Yokomizo et al. | 326/80 |
| 6,034,537 | A | * | 3/2000 | Burrows et al. | 326/33 |
| 6,292,028 | B1 | * | 9/2001 | Tomita | 326/86 |

* cited by examiner

Primary Examiner—Michael Tokar
Assistant Examiner—Anh Tran
(74) Attorney, Agent, or Firm—Christopher D. Maiorana, P.C.

(57) ABSTRACT

A circuit configured to match an impedance of a first pin and a second pin coupled to a transmission line. A resistor configured to match a resistance of the transmission line across the first and second pins and provide a voltage level independent of process corner and temperature variation. The voltage swing of the differential buffer generally has less sensitivity to variation in load resistor value.

20 Claims, 4 Drawing Sheets

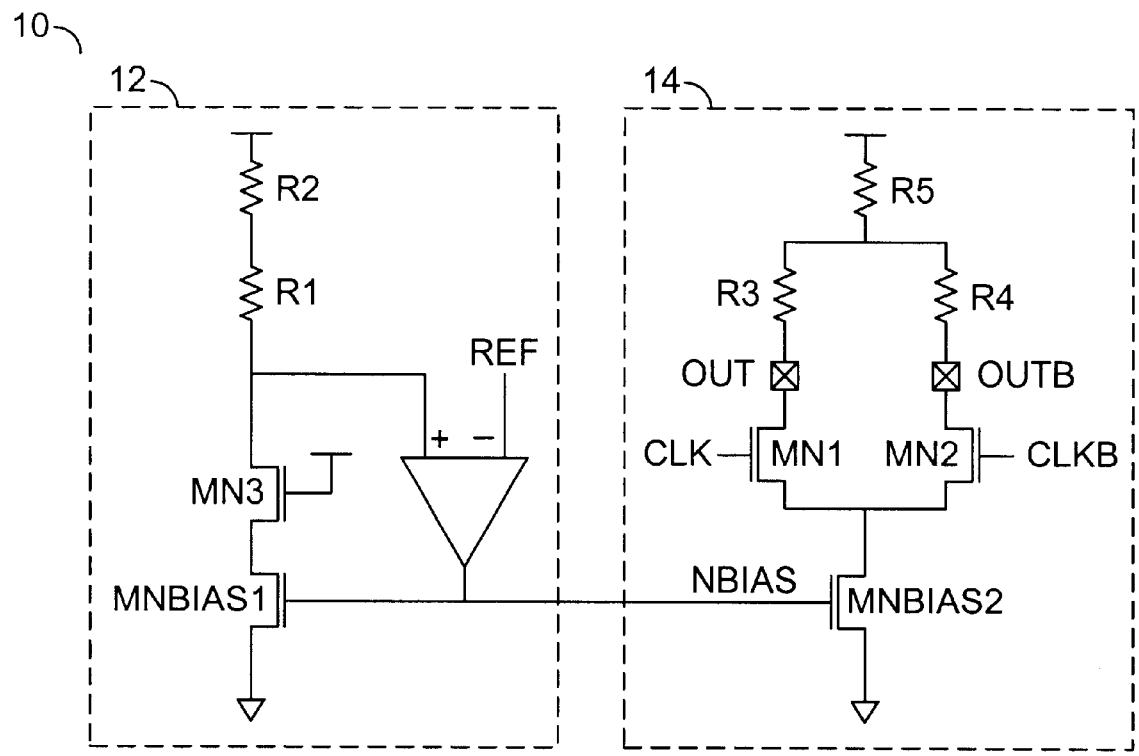
(CONVENTIONAL)
FIG. 1

US 6,593,769 B1

DIFFERENTIAL, REDUCED SWING BUFFER DESIGN

FIELD OF THE INVENTION

The present invention relates to a method and/or architecture for implementing buffers generally and, more particularly, to a method and/or architecture for implementing differential, reduced swing buffers.

BACKGROUND OF THE INVENTION

Referring to FIG. 1, a conventional reduced swing buffer 10 is shown. Reduced swing buffers are typically implemented in serial data communication and high speed data transfer applications. The buffer 10 implements current steering utilizing a scaled replica biasing scheme. The conventional reduced swing buffer 10 comprises a negative bias circuit 12 and a driver circuit 14. The bias circuit 12 implements a resistor R1 and a resistor R2. The driver circuit 14 implements a resistor R3, a resistor R4 and a resistor R5. The resistors R1, R2, R3, R4 and R5 are external resistors. The external resistors R1, R2, R3, R4 and R5 require the circuit 10 to implement additional external components. The resistors R1–R5 are required since a customer needs to configure (i.e., add) a proper resistance to the circuit 10. The circuit 10 is resistance matched at a load end and not at the source end. The bias circuit 12 implements a minimum negative bias transistor MNBIAS1 in a saturated region. The driver circuit 14 implements a minimum negative bias transistor MNBIAS2 in a saturation region. The saturated transistors MNBIAS1 and MNBIAS2 require additional pins to receive the negative bias signal NBIAS. Additionally, the driver circuit 14 cannot implement a resistor across a true output (i.e., OUT) and a complement output (i.e., OUTb).

SUMMARY OF THE INVENTION

The present invention concerns a circuit configured to match an impedance of a first pin and a second pin coupled to a transmission line. A resistor configured to match a resistance of the transmission line across the first and second pins is implemented to provide a voltage level independent of process corner and temperature variation.

The objects, features and advantages of the present invention include providing a method and/or architecture for a differential reduced swing buffer that may (i) provide voltage levels independent of process corner and temperature variations, (ii) match an impedance of a transmission line and/or (iii) have reduced sensitivity to variation in a load resistor.

BRIEF DESCRIPTION OF THE DRAWINGS

These and other objects, features and advantages of the present invention will be apparent from the following detailed description and the appended claims and drawings in which:

FIG. 1 is a block diagram of a conventional differential buffer;

DETAILED DESCRIPTION OF THE PREFERRED EMBODIMENTS

With ever increasing clock frequencies and integration levels of CMOS circuits, input/output and interconnect issues are becoming a growing concern because of high frequencies that have faster edge rates and low power dissipation. Additionally, increasing bit rates, power dissipation and edge transition rates associated with full swing interconnect signals are becoming difficult to handle because of high power dissipation and slower edge rates. However, low swing signaling improves speed (e.g., In performance) along with lower power dissipation of a device.

Figure 2:
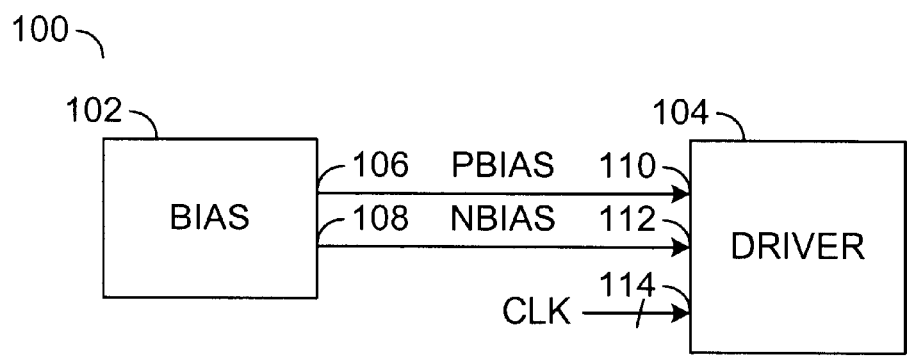
FIG. 2 is a block diagram of a preferred embodiment of the present invention.

Referring to FIG. 2, a block diagram of a circuit 100 is shown in accordance with a preferred embodiment of the present invention. The circuit 100 may be implemented as a differential, reduced (e.g., low) swing buffer. Swing may be a voltage difference between output pins (e.g., the difference between a voltage output high level VOH and a voltage output low level VOL). Specifically, reduced swing may be less than Vpower-Vground. The circuit 100 may generate voltage levels that may be independent of process corner and temperature variations. The circuit 100 may provide a driver circuit that may match impedance of a transmission line and allow a swing of the circuit 100 to have reduced sensitivity to variations in a load resistor. Additionally, the differential reduced swing buffer 100 may provide an improved driver circuit architecture.

The circuit 100 generally comprises a bias section (or circuit) 102 and a driver section (or circuit) 104. The bias section 104 may have an output 106 that may present a signal (e.g., PBIAS) and an output 108 that may present a signal (e.g., NBIAS). In one example, the signal PBIAS may be implemented as a positive bias signal and the signal NBIAS may be implemented as a negative bias signal. A bias signal may have a voltage that may vary across process corner or temperature variations in order to allow an output to remain constant across process corner or temperature variations. However, the signal PBIAS and the signal NBIAS may be implemented as other appropriate type signals in order to meet the criteria of a particular implementation. The driver section 104 may have an input 110 that may receive the signal PBIAS, an input 112 that may receive the signal NBIAS and an input 114 that may receive two differential clock signals (e.g., CLK and CLKb).

Figure 3:
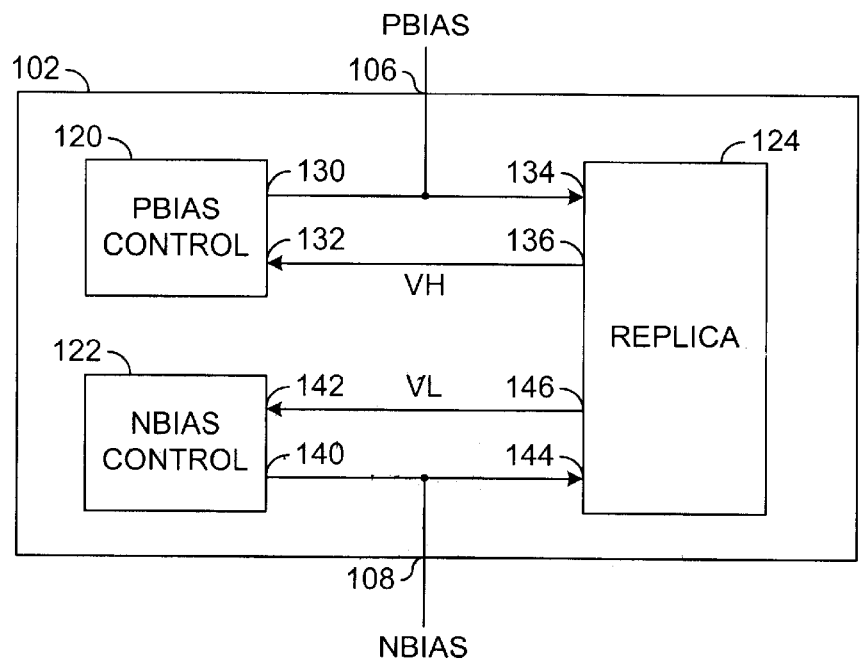
FIG. 3 is a block diagram of the bias section of a preferred embodiment of the present invention.

Referring to FIG. 3, a block diagram of the bias section 102 is shown. The bias section 102 generally comprises a control block (or circuit) 120, a control block (or circuit) 122 and a replica block (or circuit) 124. The control circuit 120 may be implemented, in one example, as an PBIAS control circuit. The control circuit 122 may be implemented, in one example, as an NBIAS control circuit. Alternatively, control circuit 120 and the control circuit 122 may be implemented as a single device.

The PBIAS control circuit 120 may have an output 130 that may present the signal PBIAS and an input 132 that may receive a signal (e.g., VH). The signal PBIAS may be presented to the output 106 as well as to an input 134 of the replica block 124. The replica block 124 may have an output that may present the signal VH. The control circuit 122 may have an output 140 that may present the signal NBIAS and an input 142 that may receive a signal (e.g., VL). The signal NBIAS may be presented to the output 108 as well as to an input 144 of the replica block 124. The replica block 124 may have an output 146 that may present the signal VL. The signals VH and VL may be implemented as a high voltage signal (e.g., VOH of a differential buffer) and a low voltage signal (e.g., VOL of a differential buffer), respectively. Additionally, a particular voltage level of the signals VH and VL may vary dependent upon a particular implementation. However, the signal VH and the signal VL may be implemented as a voltage level, a voltage on a node, or other appropriate type signal in order to meet the criteria of a particular implementation.

Figure 4:
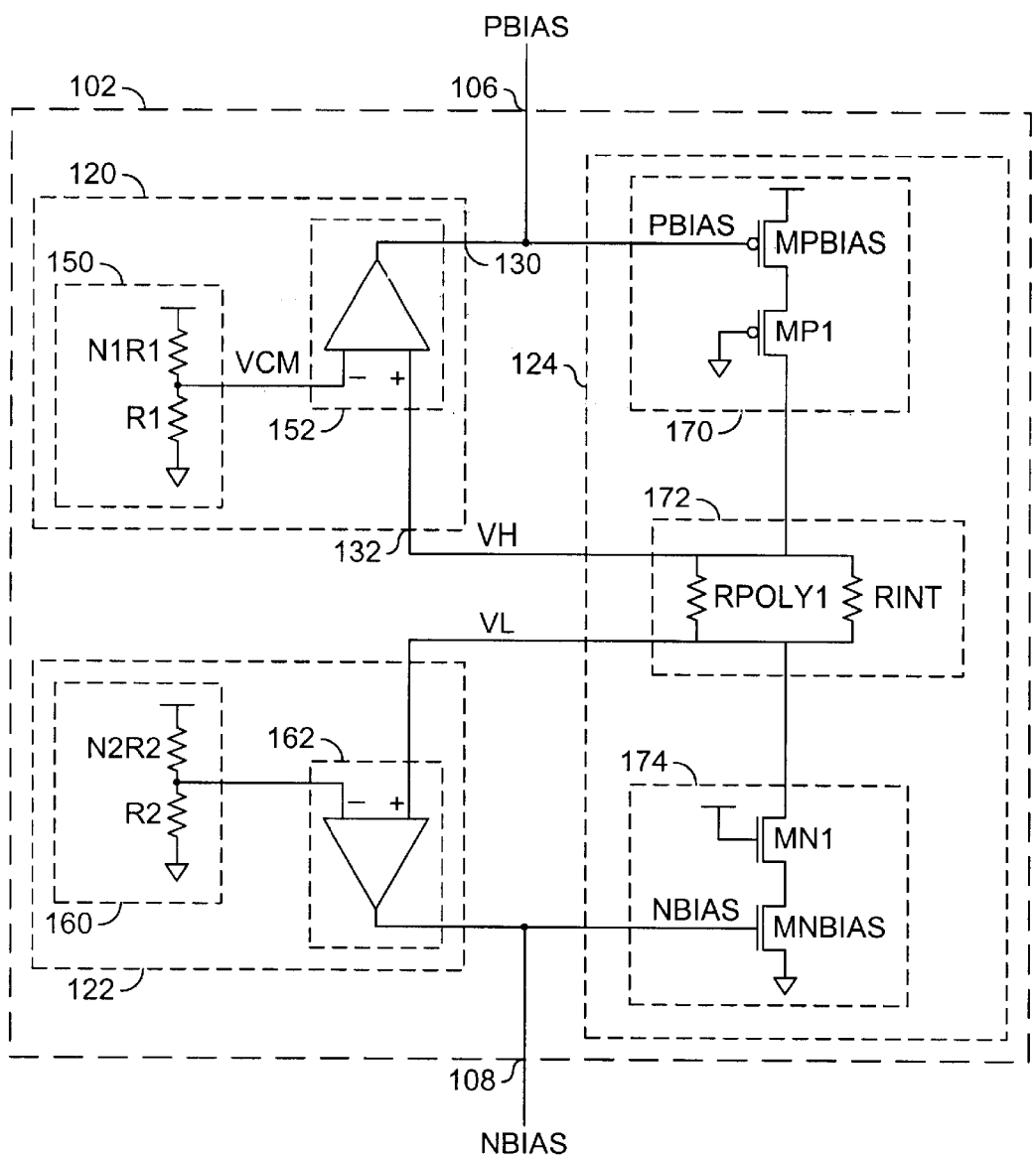
FIG. 4 is a detailed block diagram of the bias section of FIGS. 2 and 3.

Referring to FIG. 4, a detailed diagram of the bias circuit 102 is shown. The control circuit 120 generally comprises a resistor portion (or section) 150 and a summing portion (or section) 152. The section 150 generally comprises the resistor N1R1 and a resistor R1. A first side of the resistor N1R1 may be coupled to the power supply. A second side of the resistor N1R1 may be coupled to a first side of the resistor R1. A second side of the resistor R1 may be coupled to ground. The summing portion 152 generally comprises a comparator. A negative input of the comparator may be coupled between the resistor N1R1 and the resistor R1. A positive input of the comparator may receive the signal VH. An output of the comparator may be configured to generate the signal PBIAS. However, the comparator or appropriate type circuit may be implemented to compare the inputs and generate the signal PBIAS.

The control circuit 122 generally comprises a resistance portion (or section) 160 and a summing portion (or section) 162. The section 160 generally comprises a resistor N2R2 and a resistor R2. A first side of the resistor N2R2 may be coupled to the power supply. A second side of the resistor N2R2 may be coupled to a first side of the resistor R2. A second side of the resistor R2 may be coupled to ground. The summing portion 162 generally comprises a comparator. A negative input of the comparator may be coupled between the resistor N2R2 and the resistor R2. A positive input of the comparator may receive the signal VL. An output of the comparator may be configured to generate the signal NBIAS based on a comparison of the inputs.

The comparators of the summing sections 152 and 162 may provide a high gain amplifier. In a preferred implementation, the comparators of the section 152 and the section 162 may be implemented as operational transconductance amplifiers. The output voltage of the resistor network (the section 150) remains constant across process corner and temperature variation. Because of the high gain of the operational transconductance amplifiers of section 152 and 162, the voltage VH and VL may also remain constant over process corner and temperature variation.

The circuit 124 generally comprises a section 170, a section 172 and a section 174. The section 170 generally comprises a transistor MPBIAS and a transistor MP1. The transistors MPBIAS and MP1 may be implemented as PMOS transistors. An inverted gate of the transistor MPBIAS may receive the signal PBIAS, a source of the transistor MPBIAS may be coupled to the power supply and a drain of the transistor MPBIAS may be coupled to a source of the transistor MP1. An inverted gate of the transistor MP1 may be coupled to ground and a drain of the transistor MP1 may be coupled to the node VH.

The section 172 generally comprises a resistor (e.g., RPOLY1) and a resistor (e.g., RINT). The resistor RINT is an internal resistor having a value equal to the load resistor RL connected between the output pairs (OUT and OUTb). A first side of the resistor RPOLY1 may be coupled to the node VH and a second side of the resistor RPOLY1 may be coupled to the node VL. A first side of the resistor RINT may be coupled to the node VH and a second side of the resistor RINT may be coupled to the node VL.

The section 174 generally comprises a transistor MN1 and a transistor MNBIAS. The transistors MN1 and MNBIAS may be implemented as NMOS transistors. A gate of the transistor MN1 may be coupled to the power source, a source of the transistor MN1 may be coupled to the node VL and a drain of the transistor MN1 may be coupled to a source of the transistor MNBIAS. A gate of the transistor MNBIAS may receive the signal NBIAS and a drain of the transistor MNBIAS may be coupled to ground.

Figure 5:
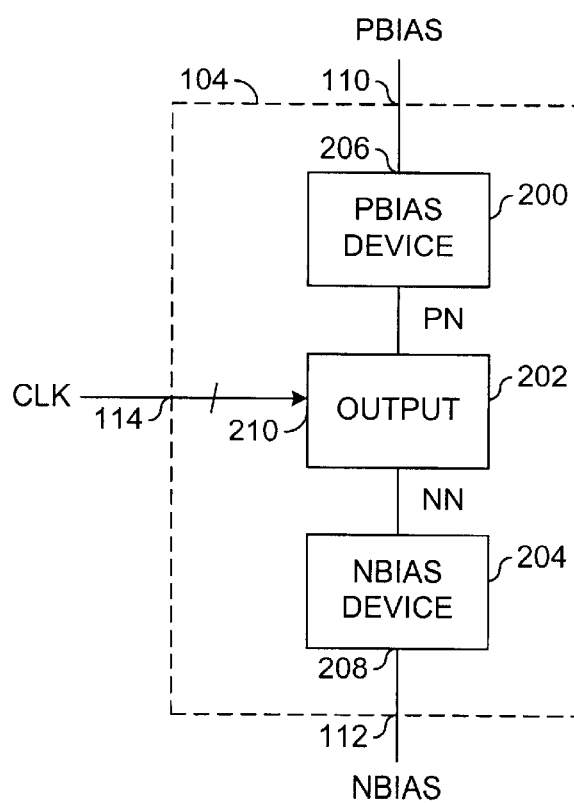
FIG. 5 is a block diagram of the driver section of a preferred embodiment of the present invention.

Referring to FIG. 5, a block diagram of the driver circuit 104 is shown. The driver circuit 104 may be implemented, in one example, as an output driver circuit. The driver circuit 104 generally comprises a section 200, a section 202 and a section 204. The section 200 may be implemented, in one example, as a PBIAS device (to be described in more detail in connection with FIG. 6). The section 204 may be implemented as an NBIAS device (to be described in more detail in connection with FIG. 6).

The PBIAS device 200 may have an input 206 that may receive the signal PBIAS. The NBIAS device 204 may have an input 208 that may receive the signal NBIAS. The PBIAS device 200 may present a signal (e.g., PN) to the output circuit 202. The NBIAS device 204 may present a signal (e.g., NN) to the output circuit 202. In one example, the signal PN may be implemented as a positive voltage. In another example, the signal NN may be implemented as a negative voltage. However, the signals PN and NN may be implemented as a voltage level, a voltage on a node, or another appropriate type signal in order to meet the criteria of a particular implementation. Additionally, the output section 202 may have an input 210 that may receive the signal CLK.

Figure 6:
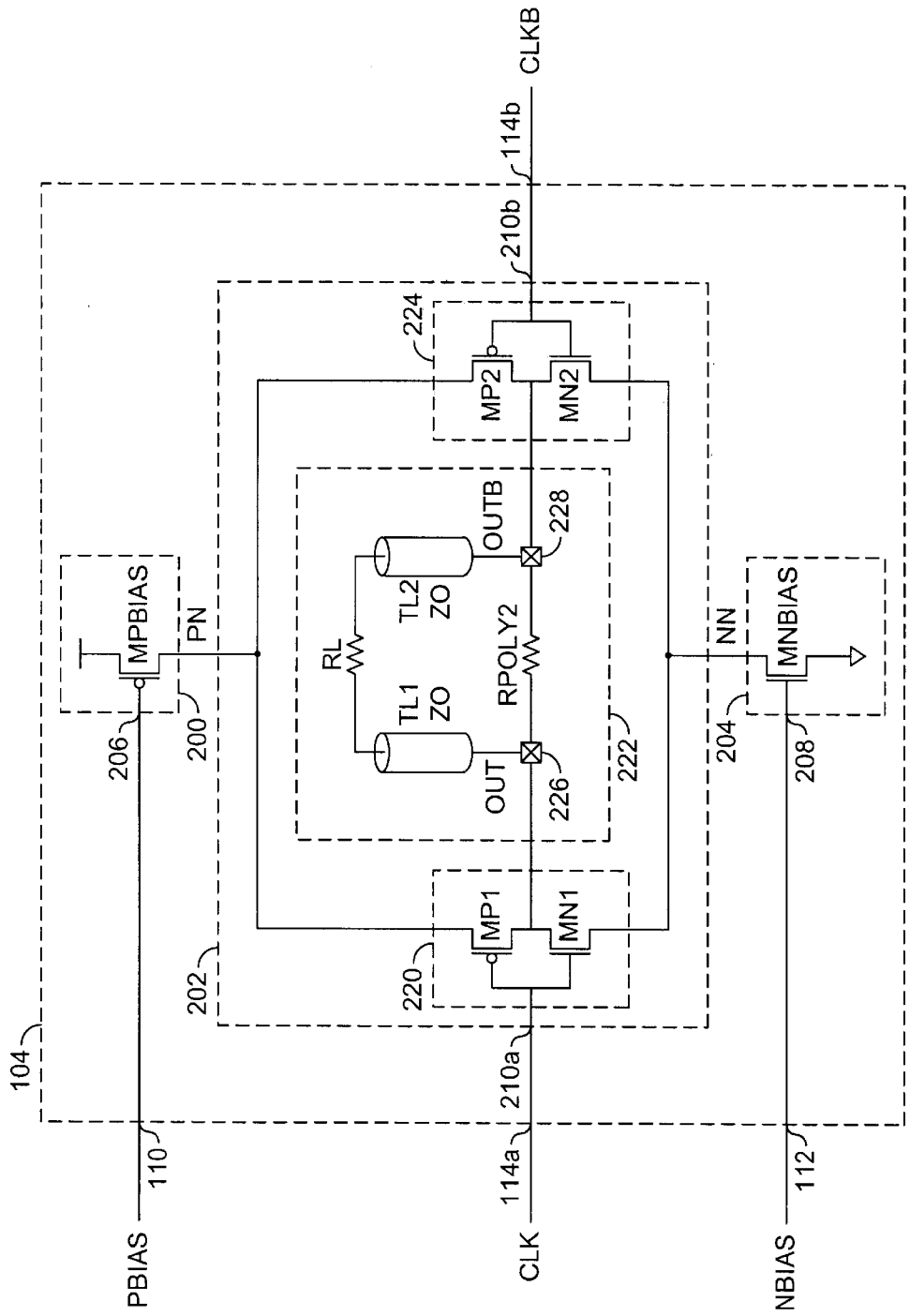
FIG. 6 is a detailed block diagram of the driver section of FIGS. 2 and 5.

Referring to FIG. 6, a detailed diagram of the driver circuit 104 is shown. The section 200 generally comprises a transistor (e.g., MPBIAS). The transistor MPBIAS may be implemented as a PMOS transistor. A gate of the transistor MPBIAS may receive the signal PBIAS, a source of the transistor MPBIAS may be coupled to the power supply and a drain of the transistor MPBIAS may be coupled to the node PN.

The section 204 generally comprises a transistor (e.g., MNBIAS). The transistor MNBIAS may be implemented as an NMOS transistor. A gate of the transistor MNBIAS may receive the signal NBIAS, a source of the transistor MNBIAS may be coupled to the node NN and a drain of the transistor MNBIAS may be coupled to ground. The transistor MPBIAS and the transistor MNBIAS may be implemented in an ohmic region as opposed to a saturated region. In particular, the MPBIAS device and the MNBIAS device may each be implemented to operate in a linear region.

The section 202 generally comprises a section 220, a section 222 and a section 224. Additionally, the section 202 may receive the clock signal CLK at the input 114a and the clock signal CLKb at the input 114b. The section 220 may be coupled to the node PN and the node NN. The section 220 may comprise a transistor (e.g., MP1) and a transistor (e.g., MN1). The transistor MP1 may be implemented as a PMOS transistor. The transistor MN1 may be implemented as an NMOS transistor. An inverted gate of the transistor MP1 may receive the clock signal CLK, a source of the transistor MP1 may be coupled to the node PN and a drain of the transistor MP1 may be coupled to a node (e.g., OUT). A gate of the transistor MN1 may receive the signal CLK, a source of the transistor MN1 may be coupled to the node OUT and a drain of the transistor MN1 may be coupled to the node NN.

The section 224 may be coupled to the node PN and the node NN. The section 224 may comprise a transistor (e.g., MP2) and a transistor (e.g., MN2) The transistor MP2 may be implemented as a PMOS transistor. The transistor MN2 may be implemented as an NMOS transistor. A gate of the transistor MP2 may receive the clock signal CLKb, a source of the transistor MP2 may be coupled to the node PN and a drain of the transistor MP2 may be coupled to a node (e.g., OUTB). A gate of the transistor MN2 may receive the signal CLKb, a source of the transistor MN2 may be coupled to the node OUTB and a drain of the transistor MN2 may be coupled to the node NN.

The section 222 generally comprise a pin (or output) 226 and a pin (or output) 228. The pin 226 may be coupled to the node OUT. Therefore, the pin 226 may be coupled to the drain of the transistor MP1 and the source of the transistor MN1. The pin 228 may be coupled to the node OUTB. Therefore, the pin 228 may be coupled to the drain of the transistor MP2 and the source of the transistor MN2. The node OUTB may represent a digital complement of the node OUT. The pin 226 and the pin 228 may be coupled by a first pin of the transmission lines, TL1 and TL2, as shown in section 222. The output side of the transmission lines TL1 and TL2 may be coupled by a load resistor (e.g., RL) between a true and a complement output of the differential buffer 100.

The circuit 100 may be implemented such that the resistance looking into the terminal OUT or OUTb is equal to the characteristic impedance of the transmission lines TL1 and TL2 by appropriately choosing the value of the resistor RPOLY2. The bias circuit 102 may set voltage levels at PBIAS and NBIAS such that the voltage levels of the signals OUT and OUTb of the circuit 104 remain constant across process corner and temperature variation.

The circuit 104 may be a differential driver circuit. The driver 104 may receive clock signals (e.g., the clock signals CLK and CLKb) which may be 180 degree out of phase and generates outputs (e.g., the outputs OUT and OUTb) which may be reduced swing outputs. If the clock signal CLK is high, the clock signal CLKb may be low and a current path of the circuit 104 may transcend from a power supply through the transistor MPBIAS to the transistor MP2, the resistor(s) RPOLY2/RL, and then the transistor MN1 and the transistor MNBIAS. The driver circuit 104 may set the voltage level VOH on the output pin OUTb and the voltage level VOL on the output pin OUT. Because of symmetry with the bias circuit 102, the voltage levels VOL and VOH may not significantly vary across corner and temperature variations (due to the bias signals PBIAS and NBIAS which will vary across process corner and temperature to ensure that the signals OUT and OUTb remain constant). Similarly, if the clock signal CLK is low, the clock signal CLKb may be high and the current path may transcend from the power supply through the transistor MPBIAS, the transistor MP1, the resistor(s) RPOLY2/RL, and then the transistor MN2 and the transistor MNBIAS. The driver circuit 104 may then set the voltage level VOH on the output pin OUT and the voltage level VOL on the output pin OUTb. The circuit 104 may allow the clock signals CLK and CLKb to switches between the power supply and ground. The circuit 104 may have output pins (e.g., the pins OUT and OUTb) which may switch between the voltage levels VOH and VOL.

The swing of the circuit 100 may be determined by the resistance of the resistor RPOLY2 and the resistor RL. If a resistive value of the resistor RPOLY2 is small compared to a resistive value of the resistor RL, the swing may not significantly vary. Furthermore, the swing may not significantly vary if the resistance value of the resistor RL varies. For example, the swing may have a variation over the process corner and temperature of 30–40 mV. The circuit 100 may provide a method for matched transmission line impedance.

The bias circuit 102 may set the signal VH and the signal VL at levels equal to VOH (Voltage Output High) and VOL (Voltage Output Low), respectively. The circuit 100 may provide a low swing differential driver in a CMOS device. The circuit 100 may provide matched impedance to a transmission line (e.g., matching of the resistor looking into the nodes OUT or OUTb and the resistor RL). The circuit 100 may provide VOH and VOL levels that do not significantly vary across the-process corner and temperature. The circuit 100 may have less sensitivity to variation in a load resistor value. The circuit 100 may produce levels which are independent of process corner and temperature variation. The circuit 100 may match impedance of a transmission line (e.g., matching of the resistor looking into the nodes OUT or OUTb and the resistor RL) and have reduced sensitivity to variation in the load resistor.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, a particular implementation of a PMOS and/or NMOS transistor may be adjusted in order to meet the criteria of a particular implementation. However, a particular polarity of the various PMOS/NMOS signals may need to be adjusted, respectively.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   an output driver receiving a differential input signal, a first bias signal and a second bias signal, and providing a differential output signal;
   a first pin and a second pin configured to couple said differential output signal to a transmission line;
   a first bias circuit generating said first bias signal;
   a second bias circuit generating said second bias signal;
   a first resistor coupled between said first and second bias circuits, said first resistor having a first resistance; and
   a second resistor coupled between said first and second pins, said second resistor having a second resistance, wherein (i) said first resistance matches a load resistance of said transmission line and (ii) said second resistance is configured to determine a swing of said differential output signal.

2. The circuit according to claim 1, wherein said differential output signal has a first voltage level and a second voltage level.

3. The circuit according to claim 2, wherein said first voltage level comprises a voltage output high (VOH) level and said second voltage level comprises a voltage output low (VOL) level.

4. The circuit according to claim 3, wherein said VOH and VOL levels do not significantly vary across process corner and temperature variations.

5. The circuit according to claim 1, wherein said circuit has a reduced sensitivity to variations in said load resistance.

6. The circuit according to claim 1, wherein said output driver comprises a CMOS device.

7. The circuit according to claim 1, wherein said output driver comprises a reduced swing output driver.

8. The circuit according to claim 1, wherein said differential input signal comprises a differential clock signal.

9. The circuit according to claim 1, wherein said first bias signal comprises a positive bias signal and said second bias signal comprises a negative bias signal.

10. The circuit according to claim 1, wherein:

said first bias circuit comprises a first comparator configured to generate said first bias signal in response to a first voltage level at a first terminal of said first resistor; and said second bias circuit comprises a second comparator configured to generate said second bias signal in response to a second voltage level at a second terminal of said first resistor.

11. The circuit according to claim 10, wherein said first and second comparators comprise operational amplifiers.

12. The circuit according to claim 10, wherein said first and second comparators comprise high gain operational transconductance amplifiers.

13. An apparatus comprising:

means for generating a differential output signal in response to a differential input signal, a first bias signal and a second bias signal;

first and second pins receiving said differential output signal;

means for generating said first and second bias signals;

means for matching a load resistance of a differential transmission line coupled to said first and second pins; and means for determining a swing of said differential output signal.

14. A method for reducing swing of a differential output buffer comprising the steps of:

(A) matching an impedance of a differential transmission line coupled to first and second differential output pins receiving a differential output signal from said differential output buffer;

(B) controlling a swing across said first and second differential output pins by coupling a first resistor having a first resistance across said first and second differential pins; and (C) providing a bias circuit coupled to said differential output buffer, said bias circuit comprising a second resistor having a second resistance matched to a load resistance of said differential transmission line.

15. The method according to claim 14, wherein high and low output voltage levels at said differential output pins do not significantly vary with process corner and temperature variations.

16. The circuit according to claim 1, wherein each of said first and second bias circuits comprises a bias control circuit and a replica circuit.

17. The circuit according to claim 16, wherein each of said bias control circuits comprises:

a resistor portion providing a constant voltage; and a comparator receiving said constant voltage and an output from said replica circuit, said output from said replica circuit being coupled to said first resistor.

18. The circuit according to claim 16, wherein each of said replica circuits comprises:

a first transistor operating in a linear region and receiving one of said first and second bias signals; and a second transistor coupled between said first transistor and said first resistor.

19. The circuit according to claim 1, further comprising a third resistor coupled in parallel with said first resistor.

20. The circuit according to claim 1, wherein said second resistance is smaller than said first resistance.

* * * * *